Nov. 10, 1925.
J. SLEPIAN
1,561,362
CREST VOLT METER
Filed Dec. 13, 1920
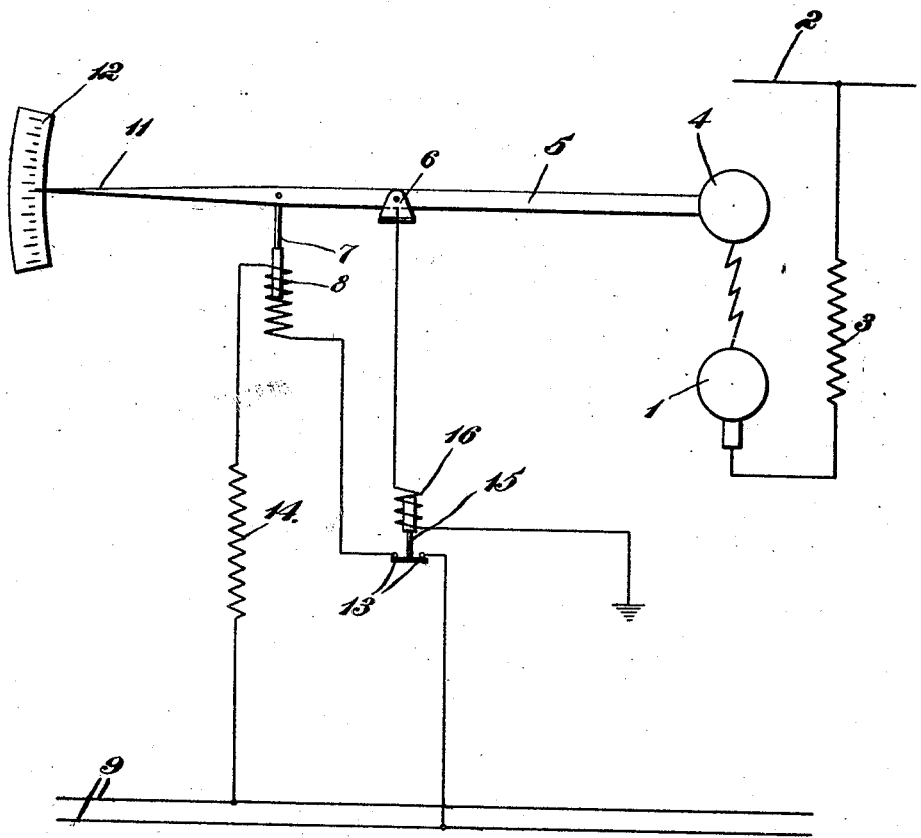
WITNESSES:
INVENTOR
Joseph Slepian
BY
ATTORNEY Patented Nov. 10, 1925.

1,561,362

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

CREST VOLTMETER.

Application filed December 13, 1920. Serial No. 430,562.

*To all whom it may concern:*

Be it known that I, JOSEPH SLEPIAN, a citizen of the United States, and a resident of Swissvale, in the county of Allegheny and State of Pennsylvania, have invented a new and useful Improvement in Crest Voltmeters, of which the following is a specification.

My invention relates to volt meters and it has special relation to meters of this type which are adapted to indicate the crest or peak value of the voltage.

One object of my invention is to provide a direct-reading instrument, of the above-indicated character, which shall be efficient and reliable in operation.

Another object of my invention is to provide a direct-reading instrument, of the above-indicated character, which shall be responsive to variable spark gap.

Heretofore, various methods for indicating the crest or peak values of applied voltages have been employed, but these instruments have been comparatively complicated, and, in many instances, have not been of the direct-reading type.

The present invention contemplates providing a direct-reading instrument which shall make use of a variable spark gap to indicate these values. In the present illustration, the regulation of the movement of the spark contacts from each other is under the control of the current from the circuit, the voltage of which is to be measured.

My invention may be best understood from the accompanying drawings, wherein the single figure is a diagrammatic illustration of circuits and apparatus embodying my invention.

A sphere 1, constituting one of the spark contacts, is connected to a source of power, the voltage of which is to be measured, through a conductor 2, and a resistor 3. A second sphere 4, constituting the other spark contact and being alined therewith, is adapted to be carried by an arm 5, which is pivoted at 6. On the opposite side from the sphere 4, the arm 5 has attached thereto the core 7 of an electro-magnet, the coil 8 of which is energized from conductors 9 that are connected to a suitable source of supply.

The circuit from the conductors 9 to the coil 8 of the electromagnetic switch includes the fingers 13 of an electromagnetic switch 15 and a resistor 14. The coil 16 of the switch 15 is electrically connected to the arm 5 which is electrically connected to the sphere 4. Hence, a circuit is completed from line conductor 2 which extends through the spheres 1 and 4, the arm 5, and the coil 16 to ground. Current will traverse this circuit, so long as spheres 1 and 4 remain sufficiently close to each other. This will energize the core of the switch 15 and cause this switch to bridge the fingers 13.

When the switch 15 is closed, the circuit to the coil 8 will be completed which, in turn, will energize the core 7. Inasmuch as this core is mounted upon the opposite side of the pivot 6 from the sphere 4, the energization of the core 7 will tend to pull the arm 5 downwardly on the left-hand side of the pivot 6, thereby separating the spheres 1 and 4. It will be apparent that this action will continue until such time as the spheres 1 and 4 are sufficiently far apart to break down the spark gap therebetween. At this time, no current will flow through the coil 16, and, thus, the circuit to the coil 8 will be interrupted at the fingers 13. Hence, the sphere 4 will gravitate toward the sphere 1. It will be apparent that, if voltage is still supplied to the sphere 1, current will pass to the sphere 4 as soon as that sphere comes within the spark range thereof.

At this time, coil 16 will be again energized to, in turn, control the energization of coil 8, as above described. Consequently, a point will be reached where the sphere 4 is just out of the range of the voltage from sphere 1 and where any movement of the sphere 4 nearer sphere 1 will permit the current, in the form of an arc, to flow between these spheres.

It is well known that spark discharges occur at maximum voltages. Therefore, the intermediate position just described for the sphere 4 will be an indication of the peak value of the voltage applied to sphere 1.

In order that this may be indicated as soon as the sphere 4 occupies this position, a pointer or indicator 11 is mounted on the opposite end of the arm 5 from the sphere 4. The pointer 11 moves over, and cooperates with, a scale 12, which scale is adapted to be suitably calibrated to indicate the crest values of applied voltages. The position of the indicator 11 with respect to the scale 12, is an accurate measure of the crest or peak value of the voltage applied to the sphere 1.

From the foregoing description, it will be apparent that the present invention provides a greatly simplified direct-reading crest volt meter.

I do not wish to be limited to the specific apparatus and circuits herein set forth, as many modifications thereof may be made within the spirit and scope of my invention. I desire, therefore, that only such limitations shall be imposed as are embodied in the appended claims.

I claim as my invention:—

1. In a high-voltage measuring instrument, the combination with a sphere adapted to be energized from a source of power, the voltage of which is to be measured, a pivoted arm having, at one end thereof, a sphere which is in alinement with the first-mentioned sphere and having, at the other end thereof, an indicator, and a suitably calibrated scale for co-operation with said indicator, of an electromagnet adapted to actuate the arm to separate the spheres when the electromagnet is energized, and a circuit for energizing said electromagnet which includes an electromagnetic switch, the operating coil of which is energized by the current flowing between said spheres.

2. In a high-voltage measuring instrument, the combination with a sphere adapted to be energized from a source of power, the voltage of which is to be measured, a pivoted arm having at one end thereof a sphere which is in alinement with the first-mentioned sphere and having, at the other end thereof, an indicator, and a suitably calibrated scale for the indicator, of an electromagnet adapted to actuate the arm to separate the spheres, said electromagnet being controlled by the current flowing between said spheres.

3. A high-voltage measuring instrument comprising a plurality of spheres in circuit with the source of power, the voltage of which is to be measured, of a pivoted arm upon which one of said spheres is mounted, an indicator also mounted upon said arm, a suitably calibrated scale for the indicator, and means operating said indicator in accordance with the current flowing between said spheres.

4. In high-voltage measuring instruments, the combination with a sphere adapted to be energized from a source of power, the voltage of which is to be measured, and a pivoted arm having at one end thereof a sphere which is in alinement with the first-mentioned sphere, of an electromagnet adapted to actuate the arm to separate said spheres, and a circuit for energizing said electromagnet which includes an electromagnetic switch, the operating coil of which is energized by the current flowing between said spheres.

5. A high-voltage measuring instrument comprising two spheres, one of which is in circuit with the source of energy, the voltage of which is to be measured, a pivoted arm upon which the other of said spheres is mounted, an indicator also mounted upon said arm, a scale with which said indicator co-operates, and means for operating said spheres to indicate the value of the impressed voltage, said means being under the control of current traversing the spheres.

6. A high-voltage measuring instrument comprising a plurality of spheres connected across the circuit, the voltage of which is to be measured, a pivoted arm upon which one of said spheres is mounted and means for operating said spheres to indicate the value of the impressed voltage, said means being under the control of the current traversing the spheres.

7. A measuring instrument comprising relatively movable terminal members, means for effecting an indication in accordance with the amount of relative movement thereof, and means for effecting the relative movement thereof and controlled in accordance with a predetermined amount of said movement.

8. A measuring instrument comprising variable space-gap terminal means, means for giving an indication in accordance with the length of said gap and means responsive to the voltage across the gap for increasing the length of the gap until said voltage attains a peak break-down value.

9. A measuring instrument comprising relatively movable terminals, means for effecting an indication in accordance with the amount of relative movement thereof and means responsive to the voltage between said terminals for causing relative movement thereof.

10. A measuring instrument comprising relatively movable terminals, means for effecting an indication in accordance with the amount of relative movement thereof, actuating means for moving one of said terminals relative to another and means responsive to the voltage between the terminals for controlling said actuating means.

11. A measuring instrument comprising relatively movable terminals, means for effecting an indication in accordance with the amount of relative movement thereof, actuating means for moving one of said terminals relative to another and means responsive to a predetermined movement of the terminals and energized by the voltage therebetween for controlling said actuating means.

In testimony whereof, I have hereunto subscribed my name this 3rd day of December, 1920.

JOSEPH SLEPIAN.